May 2, 1967 H. F. COFFEY ET AL 3,316,854
METERING APPARATUS
Filed Dec. 22, 1965 2 Sheets-Sheet 1

INVENTORS
HENRY F. COFFEY
NORBERT R. KUZEL
BY
ATTORNEY

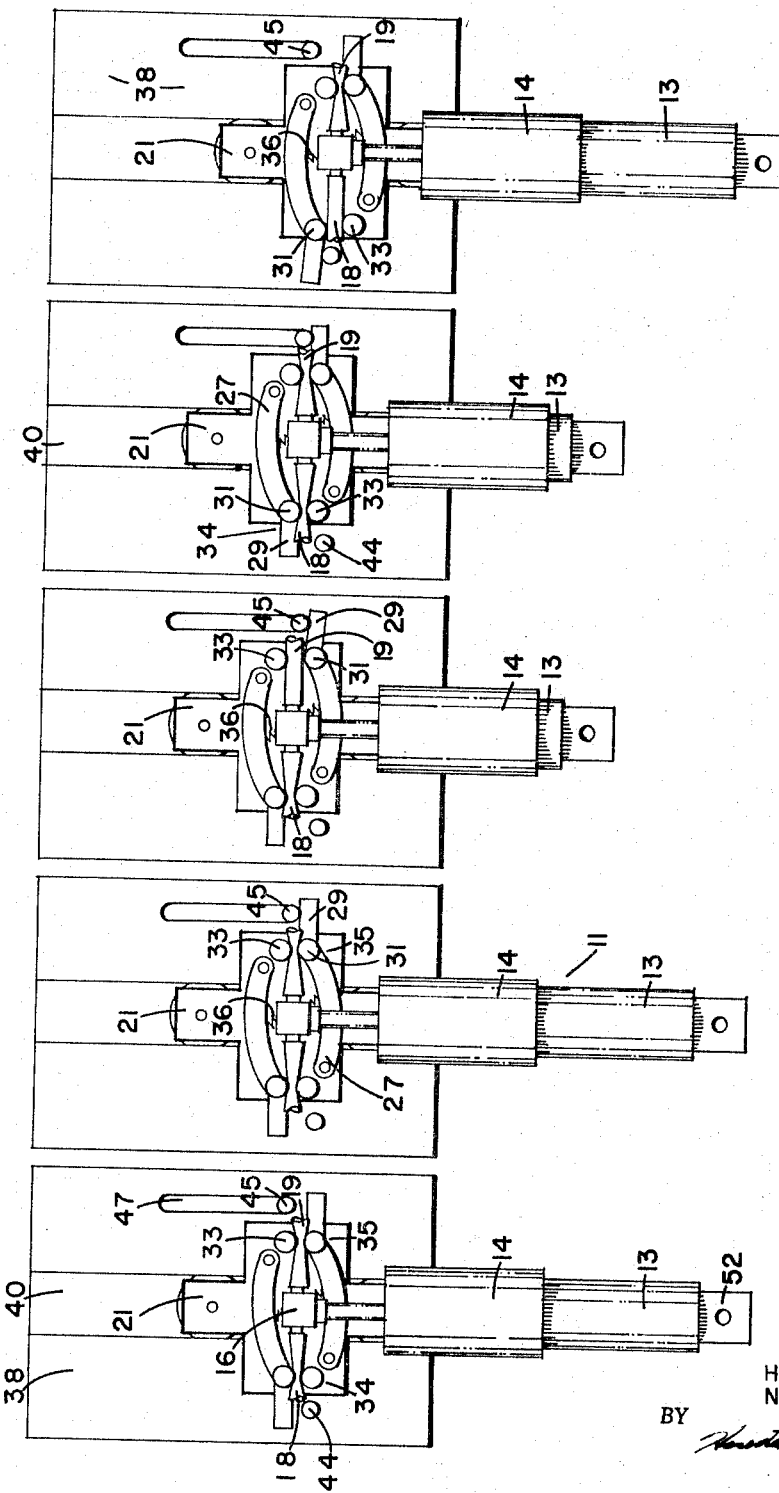

United States Patent Office 3,316,854
Patented May 2, 1967

3,316,854
METERING APPARATUS
Henry F. Coffey and Norbert R. Kuzel, both of Indianapolis, Ind., assignors to Eli Lilly and Company, Indianapolis, Ind., a corporation of Indiana
Filed Dec. 22, 1965, Ser. No. 515,574
9 Claims. (Cl. 103—227)

This invention relates to a dispensing apparatus and in particular to an apparatus capable of metering in rapid succession a predetermined quantity of a liquid.

There are a number of operations in which it is desirable to be able to accurately meter or dispense a liquid by means of a pump drawing from a supply reservoir. In particular, operations in laboratories frequently require an apparatus which will meter predetermined amounts of a liquid into a series of vessels. During such laboratory operations it is common to change to other types of liquids; and in order to avoid contamination, the filling apparatus must be completely cleaned. Thus, it is apparent that the apparatus most suitable for such operations is one which has a minimum of parts in contact with the liquid being dispensed in order to facilitate rapid clean up.

It is also desirable to incorporate in the apparatus a feature which will permit quick adjustment of the amount of liquid being metered by the pump. Apparatus of the prior art have generally accomplished this by varying the stroke of the pump which is usually a reciprocal displacement type. However, in varying the stroke of the pump it is necessary to provide a number of coupling elements which increase the cost of the pump as well as take up additional space. Such apparatus of the prior art also frequently have the disadvantage of being unable to measure precise amounts of liquid with the degree of accuracy required for certain laboratory experiments.

The filling apparatus of this invention utilizes a conventional displacement pump and a unique valve arrangement requiring a minimum of components in contact with the liquid being metered. In general, this is accomplished by a pair of valve-pinching means which clamp on flexible and resilient inlet and outlet conduits coupled to the pump. The two valve means are so coordinated that the outlet valve is firmly clamped on the outlet conduit before the pump starts to pull in liquid on its intake stroke. Likewise, the inlet valve is firmly clamped on the inlet conduit prior to the discharge stroke of the pump. Consequently, there is no need for check valves within the inlet and outlet conduits such as is normally used in other types of metering and filling apparatus.

In addition, the pump of this invention is provided with means for adjusting the coordination of the inlet and outlet valves on their respective conduits, thereby enabling one to easily make accurate adjustments in the amount of liquid metered by the pump.

It is therefore one object of this invention to provide a new and improved metering apparatus.

Another object of this invention is to provide a metering apparatus utilizing a minimum number of components in contact with the liquid being metered.

Another object of this invention is to provide a new and improved metering device having a relatively high degree of accuracy in metering repeated quantities of a liquid.

A further object of this invention is to provide a new and improved metering device having means for adjusting the quantity of liquid discharged.

Other objects and advantages will be apparent upon reading the following description in connection with the drawings in which:

FIGS. 3 through 7 are front views in elevation of the metering apparatus illustrating a full cycle of operation.

Figure 1:
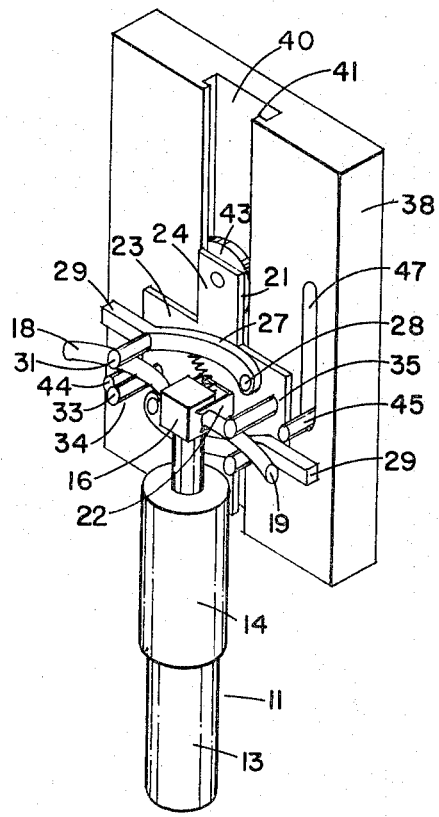
FIG. 1 is a perspective view of the metering apparatus.
Figure 2:
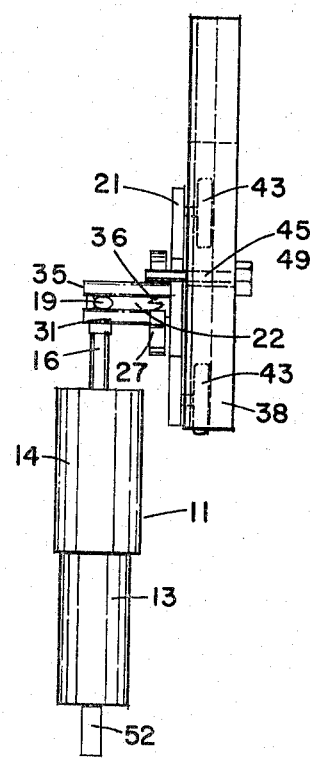
FIG. 2 is a side view in elevation of the apparatus.

Referring to FIGS. 1 and 2, a conventional reciprocal displacement pump 11 is illustrated having a piston 13 and a cylinder 14. The pump 11 has a hollow T connection 16 at its discharge end. Coupled in hydraulic communication with the T connection 16 and pump cylinder 14 are an inlet conduit 18 and an outlet conduit 19. These conduits may be formed from a resilient material such as soft rubber or any other material which will enable each of the conduits to be deformed upon being pinched completely shut and then resume their natural form when such pinching action is released. Conduit 18 will have its free end submerged in a supply reservoir containing the liquid to be metered. Conduit 19 will have its free end in a position to transmit the metered fluid into another container.

Pump cylinder 14 and T connection 16 are mounted on a pump support plate 21 by bracket 22. The particular embodiment has a horizontal element 23 and a vertical element 24. A pair of first valve members 27 are pivotally mounted at opposite ends of the horizontal element 23 of the pump support plate. The pivotal connection for each of these valve members may be at end 28 with the other end being free to move and carry a pin projection 31. Each valve member 27 also has an extension 29 projecting beyond pin 31. A pair of second valve members comprising pin projections 33 are juxtaposed from the projections 31 of the first valve members and are fixed on the horizontal element 23 of the pump support plate 21. The exact positioning of these projection pins 31 and 33 is such that they straddle the inlet and outlet conduits 18 and 19. A biasing means comprising a spring 36 is coupled between the pair of first valve members 27 and urges their extensions 29 and respective projection pins 31 toward the fixed projection pins 33. The resulting combined action of pins 31 and pins 33 provides a pair of inlet and outlet valve clamp means 34 and 35.

Pump support plate 21 is slidably mounted along the vertical axis of mounting plate 38. Mounting plate 38 has a vertical track 40 with flanges 41 which capture two rollers 43 fixed to the backside of the vertical element 24 of the pump support plate 21. This combination enables the support plate, the pump and the valve members to reciprocate along a vertical line. Mounted in a straddling relationship with respect to channel 40 are a pair of first and second operating stops comprising pins 44 and 45. Pin 44 may be fixed on mounting plate 38 whereas pin 45 is shown to be adjustable. Although pin 45 may be fixed in a manner similar to pin 44 the adjustable feature will normally be desirable in order to selectively vary the amount of liquid metered by pump 11. In the particular instance, operating stop pin 45 is positioned in a vertical groove 47 in plate 38. A nut 49 is used to tighten pin 45 in a specific position and is loosened in order to adjust pin 45 to another position. It is to be noted that both of the operating stop pins 44 and 45 are positioned to come into abutting contact with an associated extension 29 of an operating valve member 28.

The operation of the apparatus of this invention is shown in the sequence views of FIGS. 3–7. Referring to FIG. 3 the apparatus is shown in what may be considered as a state of equilibrium. By this it is meant that neither of the extensions 29 is in contact with an operating stop pin 44 or 45 causing both the inlet and outlet conduits 18 and 19 to be pinched shut. In order to understand the sequence of the pump operation it is first assumed that in FIG. 3 cylinder 14 is completely filled with the liquid to be metered. Likewise, the T connection 16 and the section of conduits 18 and 19 extending between the T connection and valve means 34 and 35 are filled with liquid. Piston 13 has a connection 52 which may be coupled to a power source. Generally, the power source will comprise an electric motor and a coupling device which will produce a reciprocating linear motion that is transmitted to the piston. However, the pump may also be operated manually.

With the pump now completely full of liquid and both inlet and outlet conduits 18 and 19 being pinched shut, an upward motion transmitted to the piston will cause the pump support plate 21 to slide upwardly in channel 40 of the mounting plate 38. Keeping in mind that the pump is completely full of liquid it is apparent that the piston 13 cannot compress the liquid and, therefore, the upward force applied to the piston is transmitted through the liquid in cylinder 14 and to plate 21 which is coupled to the cylinder by bracket 22. As shown in FIG. 4, plate 21 and pump 11 have moved slightly upward to a point where the extension 29 on the outlet valve member 27 of outlet valve means 35 has just come into abutment with operating stop pin 45. The distance traveled between FIGS. 3 and 4 may be considered "dead movement" in that both conduits remain closed for a purpose to be explained later. Similar "dead movement" also occurs when the piston completes its discharge stroke and reverses its direction downwardly. The continued upward force applied to piston 13 with contact still occurring between pin 45 and extension 29 overcomes the biasing effect of spring 36 and causes outlet valve member 27 to pivot which separates pin 31 from its pinching relationship with the second operating valve member pin 33. Thus, the two pins 31 and 33 which were originally pinching the outlet conduit have released their pressure, thereby opening outlet valve 35, and fluid from cylinder 14 is discharged through conduit 19.

In FIG. 5 the metering apparatus is illustrated in a position where the piston 13 has completed its discharge stroke and is about to return for the intake stroke. However for complete accuracy it is desirable that the outlet conduit 19 be sealed or closed prior to reversing the relative motion between piston 13 and cylinder 14. Otherwise, the downward or intake movement of piston 13 might pull in fluid from the discharge conduit and offset the accuracy of the pump. At the very peak point of piston travel when the piston no longer has an upward motion and may be considered to be motionless, spring 36 with its continuous biasing effect will operate to downwardly pull plate 21 and cylinder 14 and thereby urge pin 31 toward the outlet valve pin 33 to pinch the conduit 19 shut. The movement of these components is downward since the spring is unable to activate an upward motion because of the resistance to upward travel provided by the abutment of operating stop pin 45 against outlet valve extension 29. With the outlet conduit 19 closed and the inlet conduit 18 closed, piston 13 is now ready for its return downward stroke and the apparatus is in the position shown in FIG. 6.

FIG. 6 differs from FIG. 5 in that the outlet conduit 19 is again completely pinched to prevent further discharge of liquid. It is also to be noted in FIG. 6 the inlet conduit 18 is likewise completely closed to prevent passage of fluid. At this point the pump is infinitesimally separated in regard to sequence from the showing in FIG. 5. Thus, piston 13 is about to be pulled downwardly for intake of fluid through conduit 18.

As piston 13 starts to pull downwardly with both conduits closed it is apparent that there will be a slight vacuum within cylinder 14 causing a pressure differential between the inner chamber of cylinder 14 and the atmosphere. Therefore, cylinder 14 is forced to travel downwardly with piston 13. Likewise, plate 21 will slide downwardly on channel 40 inasmuch as the plate is coupled to the cylinder. Again, there is an initial period of "dead movement" which may be considered as a safety factor in that it provides sufficient time for completely closing outlet conduit 19. As the plate and pump continue to travel downwardly, extension 29 of the first valve member 27 on the inlet side abuts operating stop pin 44. This results in a pivoting motion on the valve member 27 thereby releasing the pinching effect of pins 31 and 33 on the inlet conduit 18 and opening inlet valve means 34. Upon opening of conduit 18 (FIG. 7) the pressure differential is broken and cylinder 14 and plate 21 become motionless. However, piston 13 continues its downward stroke until liquid fills the cylinder. At this point the pump is about to begin its discharge step.

Similar to the previously described operation, at the point where the pump is about to reverse and begin its intake step piston 13 becomes stationary for an infinitesimal amount of time. The downward force that has exceeded the force of spring 36 is eliminated. Therefore, spring 36, through its continuous biasing force, causes the plate 21 and cylinder 14 in this instance to travel upwardly until pin 33 pinches inlet conduit 18 against pin 31. The pump is now ready to repeat the discharge step and accordingly, advances through the position of FIG. 3. The previously mentioned "dead movement" assures sufficient time for complete closing of the inlet conduit 18 before outlet conduit 19 is opened.

It is apparent that the above mentioned "dead movement" which occurs at the start of the discharge and intake strokes is accomplished by precise positioning of the valve means 34 and 35 and the operating stop pins 44 and 45. This "dead movement" is particularly desirable when a high degree of accuracy is desired in metering the fluid. However, omission of this feature may be made without destroying the overall operability of the apparatus.

As previously described, operating stop pin 45 is mounted in the mounting plate 38 in an adjustable manner. The pin as shown in FIGS. 3 through 7 is in its maximum setting and will permit 100% discharge of liquid from cylinder 14. If pin 45 is moved to a point midway in slot 47 the discharge of fluid metered by pump 11 is reduced 50%. It is to be noted that this is accomplished without changing the stroke of piston 13. In other words, piston 13 will still travel the same distance it travels for 100% discharge. A 50% discharge is obtained since the effective discharge stroke of piston 13 may be considered to be reduced by 50%. Thus, although piston 13 is moving it will remain in its same relative position with respect to cylinder 14 for 50% of its stroke. This is due to the fact that for the first 50% of the piston stroke liquid is prevented from being released from cylinder 14 and therefore the cylinder and piston travel together. After the piston has traveled half of its stroke the extension 29 will abut against stop operating pin 45 and dicharge will occur. Consequently, discharge occurs only during the last half of the piston stroke.

In order to achieve a range of 100% to 0% groove 47 should equal the distance piston 13 travels. Simple tests may be run to calibrate the pump and appropriate indicia may be marked adjacent groove 47 to obtain quick adjustments for pin 45. Frequently, laboratory testing techniques call for supplying receptacles with two liquids in mixtures of varying ratios. By using two metering apparatus of the adjustable type it is apparent that ratios such as 90-10, 75-25, 40-60, 10-90, etc. can be obtained by adjusting operating stop pins 45 accordingly on the two units.

While only one embodiment of this invention has been described and illustrated, it will be apparent to those skilled in the art that modifications can be made without departing from the spirit of this invention and the scope of the appended claims.

We claim:
1. A metering apparatus comprising in combination: a mounting plate, first and second valve operating stops, a pump support plate slidably mounted on said mounting plate, a reciprocal pump mounted on said pump support plate, a pair of resilient and deformable inlet and outlet conduits on said pump, and a pair of valve clamp means on said pump support plate and biased in pinching position on said inlet and outlet conduits, each of said biased valve clamp means being positioned to alternately contact a respective one of said operating stops upon a predetermined movement of said pump and pump support plate relative to said mounting plate and overcome the biasing action on said valve clamp means and remove the pinching effect on said conduits.

2. The apparatus of claim 1 in which said operating stops comprise a pair of spaced projections extending from said mounting plate.

3. The apparatus of claim 2 in which said pump comprises a cylinder and a piston.

4. The apparatus of claim 3 in which each of said valve clamp means comprises a first valve member fixed on said pump support plate and a second valve member pivotally connected at one end thereon, each of said pairs of first and second valve members being biased toward each other and straddling one of said conduits.

5. The apparatus of claim 4 in which said valve clamp means are biased by a spring connected between said first valve members.

6. The apparatus of claim 4 in which said second valve member has its distal end aligned for abutment with one of said valve operating stops.

7. The apparatus of claim 6 in which the portions of said first and second valve members pinching said conduits each comprises a cylindrical pin.

8. The apparatus of claim 7 in which said second valve operating stop is adjacent said valve clamp means on said outlet conduit and adjustably fixed on said pump support plate along a line parallel with the line of motion of said pump support plate.

9. The apparatus of claim 8 in which the line on which said outlet valve operating stop is equal to the stroke distance of said pump piston.

References Cited by the Examiner
UNITED STATES PATENTS

| | | | |
|---|---|---|---|
| 2,017,974 | 10/1935 | Kastner | 103—227 X |
| 2,877,714 | 3/1959 | Sorg et al. | 103—149 |

ROBERT M. WALKER, *Primary Examiner.*